(12) United States Patent
Kalhan et al.

(10) Patent No.: US 8,989,172 B2
(45) Date of Patent: Mar. 24, 2015

(54) DATA ROUTING THROUGH LOCAL NETWORK CONNECTED TO A BASE STATION

(75) Inventors: Amit Kalhan, La Jolla, CA (US); Doug Dunn, Chula Vista, CA (US)

(73) Assignee: KYOCERA Corporation, Kyoto (JP)

( * ) Notice: Subject to any disclaimer, the term of this patent is extended or adjusted under 35 U.S.C. 154(b) by 1488 days.

(21) Appl. No.: 12/496,367

(22) Filed: Jul. 1, 2009

(65) Prior Publication Data

US 2010/0020779 A1    Jan. 28, 2010

Related U.S. Application Data

(60) Provisional application No. 61/082,789, filed on Jul. 22, 2008.

(51) Int. Cl.
| | |
|---|---|
| H04J 3/24 | (2006.01) |
| H04W 8/08 | (2009.01) |
| H04W 16/26 | (2009.01) |
| H04W 40/00 | (2009.01) |
| H04W 84/04 | (2009.01) |
| H04W 88/08 | (2009.01) |

(52) U.S. Cl.
CPC .............. *H04W 8/082* (2013.01); *H04W 16/26* (2013.01); *H04W 40/00* (2013.01); *H04W 84/045* (2013.01); *H04W 88/08* (2013.01)
USPC .......................................................... 370/349

(58) Field of Classification Search
USPC ......... 370/349, 338, 400, 401, 410, 231, 328, 370/331, 332, 333, 334, 447, 448, 342, 442, 370/452, 348, 465, 351–356; 455/453, 419, 455/422, 428, 561, 560
See application file for complete search history.

(56) References Cited

U.S. PATENT DOCUMENTS

| | | | | |
|---|---|---|---|---|
| 5,911,120 | A * | 6/1999 | Jarett et al. ................... | 455/417 |
| 6,064,653 | A * | 5/2000 | Farris ............................ | 370/237 |
| 6,173,177 | B1 * | 1/2001 | Lu et al. ........................ | 455/445 |
| 6,665,722 | B1 * | 12/2003 | Elliott .......................... | 709/227 |
| 7,009,950 | B1 * | 3/2006 | Hirata et al. .................. | 370/331 |
| 7,305,474 | B2 * | 12/2007 | Giaffreda et al. ............ | 709/227 |
| 7,545,780 | B2 * | 6/2009 | Chitrapu ....................... | 370/338 |
| 7,680,073 | B2 * | 3/2010 | Jamieson et al. ............ | 370/328 |
| 7,738,915 | B2 * | 6/2010 | Singh et al. ................ | 455/554.1 |
| 8,204,543 | B2 * | 6/2012 | Keevill et al. ................ | 455/561 |
| 2003/0211847 | A1 * | 11/2003 | Jang et al. .................... | 455/434 |
| 2005/0107086 | A1 * | 5/2005 | Tell et al. ..................... | 455/445 |
| 2013/0235801 | A1 * | 9/2013 | Parsons et al. ............... | 370/328 |

* cited by examiner

*Primary Examiner* — Chi H Pham
*Assistant Examiner* — Alexander O Boakye

(57) ABSTRACT

A base station routes data between a wireless communication device and a local device through a local network. When a route-local indicator is received from the wireless communication device, the base station routes data through the local network to the local device without routing the data through a cellular network. Accordingly, the physical path of the data includes the base station and the local network and does not include cellular equipment other than the base station.

20 Claims, 6 Drawing Sheets

DATA ROUTING THROUGH LOCAL NETWORK CONNECTED TO A BASE STATION

RELATED APPLICATIONS

This application claims the benefit of priority of U.S. Provisional Application No. 61/082,789 entitled "DATA ROUTING THROUGH LOCAL NETWORK CONNECTED TO BASE STATION", filed Jul. 22, 2008 and incorporated by reference in its entirety, herein.

BACKGROUND

The invention relates in general to wireless communication systems and more specifically to routing data in a wireless communication system.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve and extend coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells.

SUMMARY

A base station routes data between a wireless communication device and a local device through a local network. When a route-local indicator is received from the wireless communication device, the base station routes data through the local network to the local device without routing the data through a cellular network. Accordingly, the physical path of the data includes the base station and the local network and does not include cellular equipment other than the base station.

DETAILED DESCRIPTION

Figure 1:
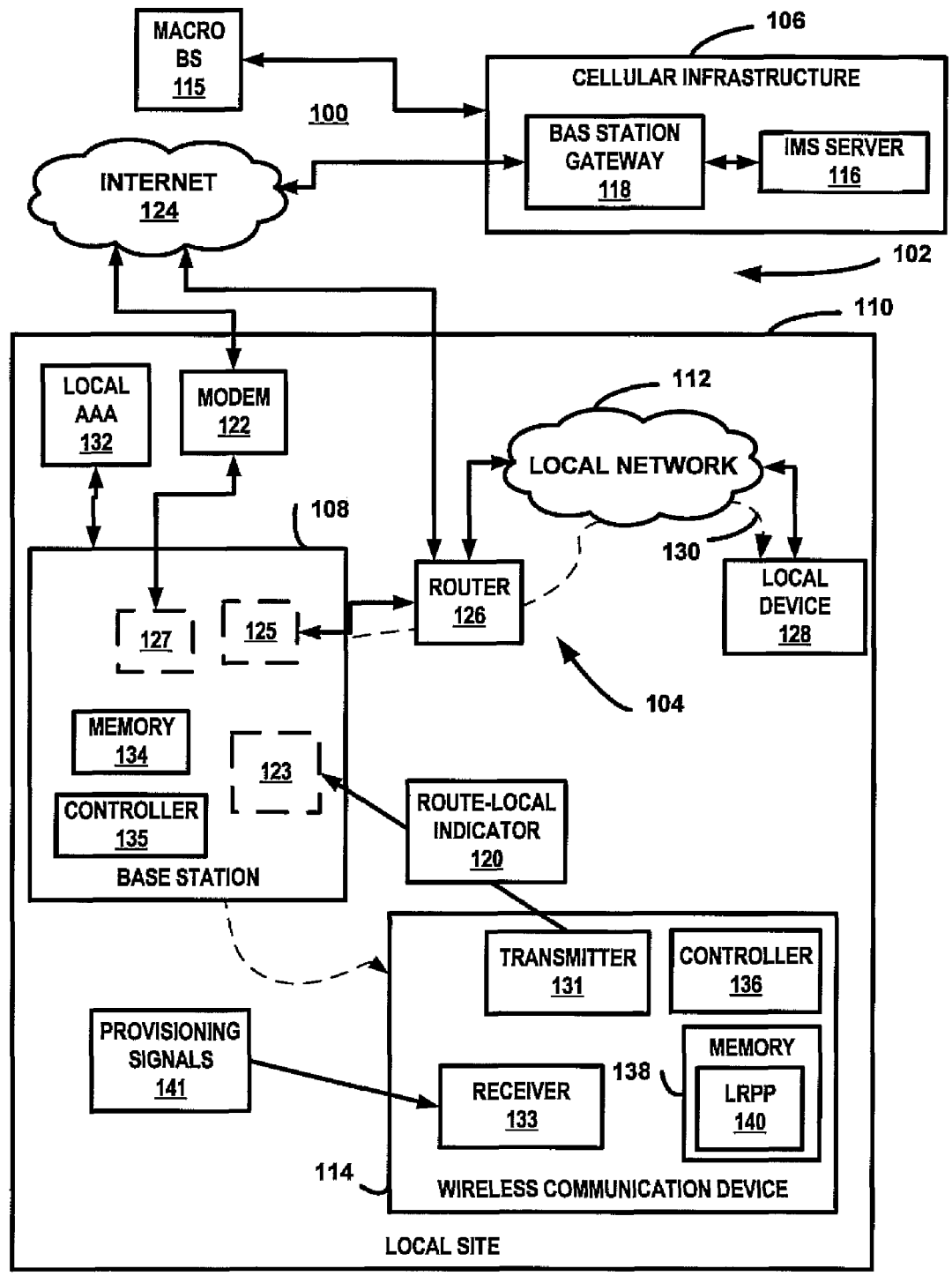
FIG. 1 is a block diagram of a communication system in accordance with the exemplary embodiment of the invention.

FIG. 1 is a block diagram of a communication system 100 in accordance with an exemplary embodiment of the invention. The communication system 100 includes a cellular communication system 102 and a local network communication system 104 where the systems 102, 104 may be implemented in accordance with any of numerous technologies and communication standards. In the exemplary embodiment, the cellular communication system 102 operates in accordance with a Code Division Multiple Access (CDMA) standard such as cdma2000 1X. Examples of other suitable communication standards include other CDMA standards such as 1xEV-DO and W-CDMA, OFDM based standards such as WiMAX, 3GPP LTE, and TDMA based standards such as GSM. The various functions and operations of the blocks described with reference to the communication system 100 may be implemented in any number of devices, circuits, and/or elements as well as with, or in combination with, various forms of executable code such as software and firmware. Two or more of the functional blocks of FIG. 1 may be integrated in a single device and the functions described as performed in any single device may be implemented over several devices. For example, the modem and router can be combined into a single device that performs the functions of a local router and a broadband modem. In another example, the base station and router are combined to form a single base station with routing capability. Such an implementation may be useful where a single access node functions as a femtocell base station within a cellular system but also provides WiFi service with wireless local area network (WLAN). Also, the router, modem and femtocell can be implemented within a single device in some circumstances.

The cellular communication system 102 includes cellular infrastructure 106 that is connected to a plurality of base stations including at least one base station 108 that is connected within a local site 110, where the local site 110 includes a local network 112. Other base stations connected to the cellular infrastructure 106 may include a macrocell base station 115. Communications between the base stations and wireless communication devices 114 are at least partially managed by the system infrastructure 106. The infrastructure includes an IP Multimedia Subsystem (IMS) sever 116 which is an architectural framework enabling delivery of internet protocol (IP) multimedia to mobile users. A base station gateway 118 within the system infrastructure is a communication interface that allows the base station 108 to communicate with the system infrastructure 106. The system infrastructure 102 may also include other equipment wiring, cabling, and resources. For example, the system infrastructure may include a base station controller (BSC) and/or a Mobile Switching Center (MSC).

The base station 108 provides wireless services within a geographical service area sometimes referred to as a cell. As discussed below, a suitable implementation of the base station 108 is within a cellular communication system 102 where the base station 108 provides wireless communication services within a femtocell to authorized users in the local site 110 such as a home or small office. The base station 108, however, may be any base station within a communication system 102 that can provide service to the wireless communication device 114, receive a route-local indicator 120, and route messages through the local network 112. Accordingly, for the examples discussed below, the base station 108 is a femtocell base station and the base station gateway 118 is a femtocell gateway.

The base station 108 in the following examples provides a relatively small service area and is limited to providing service to a relatively small number of authorized users. The base station 108 is connected to the cellular system infrastructure and is managed by the cellular system infrastructure. An example of a suitable technique for connecting the base station 108 to the cellular infrastructure includes using a modem 122 to connect to the base station gateway 118 through the Internet 124. The base station 108 is also connected to the local network 112 within the local site 110 through a local router 126. As mentioned above, the router 126 and modem 122 may be implemented in a single device in some circumstances. Also, the router 126, modem 122 and base station 108 can be implemented within a single device in some circumstances. The base station includes electronics for exchanging signals with one or more wireless communication devices. A transmitter (not shown) transmits signals and a receiver 121 receives uplink signals from the wireless communication device 114. The uplink signals may include traffic signals that convey data, voice or other user information as well as control signals. The receiver 123, therefore, is configured to receive the route-local indicator 120.

A local network interface 125 in the base station 108 connects to the local network 112 through the router 126. In some circumstances, functionality of the router 126 and local network interface 125 may be implemented in a single device.

The local network 112 may use any combination of wireless and/or wired technologies. Examples of suitable network techniques include arrangements using Ethernet, 802.11 and Bluetooth based systems. One or more local devices 128 may be connected to the local network 112 where the local device 128 may be any electronic device capable of communicating on the local network 112. Examples of local devices includes multimedia electronics such as DVDs, DVRs, televisions, audio devices such as stereos, and MP3 devices; electronics and communications equipment such as computers, telephones, printers, FAX machines, and copiers. Other examples of local devices include appliances and systems such as refrigerators, ovens, HVAC systems, pool and spa controllers, and other types of controllers.

In the examples discussed herein, the base station 108 is capable of routing data between the wireless communication device 114 and other devices through a physical path that includes the cellular infrastructure and also has the capability of routing data to a local device 128 through a local network physical path 130 including the local network 112 without routing the data through the cellular infrastructure 106. The establishment of the local network physical path 130 may be invoked by any of several conditions, signals, or messages. For the examples discussed below, the base station 108 routes data in response to signaling from the wireless communication device 114 and only when the base station 108 has received authority from the cellular infrastructure 106 to utilize local routing. As discussed below, however, the base station 108 locally routes the message without notifying the cellular infrastructure in some circumstances. In some situations, the local routing may be invoked by the type of message, commands from the cellular infrastructure, other signaling, and other criteria. For example, the base station 108 may locally route the message to a device when the device is recognized to be connected within the local network based on a device identifier or device designator. More specifically, the base station 108 may recognize an IP address of a message sent by the wireless communication device as associated with a device connected within the local network and, in response, routed the message through the local network without routing the message through the cellular infrastructure. The base station 108 includes a controller 135 such as a processor, processor arrangement, or computing device that runs code to execute the functions described herein as well as facilitating the overall functionality of the base station 108. The functions of the receiver 123 and/or the local network interface 125 may be at least partially performed by the controller 135 and memory 134. A cellular network interface 127 in the base station 108 provides connectivity to the cellular network through the modem 122 and Internet 124. The functions of the cellular network interface 127 may also be at least partially performed by the controller 135 and memory 134.

For the exemplary situation illustrated in FIG. 1, the wireless communication device 114 is an authorized user of the base station 108 that is within the server area of the base station 108. Accordingly, the wireless communications device 114 is within or is near the local site 110. As the described above, the local site 110 may be a home or office. In response to the route-local indicator 120 received from the wireless communication device 114, the base station 108 routes communications between a local device 128 and the wireless communication device 114 through the local network 112 without routing the data through the cellular infrastructure 106.

In the examples described below, the cellular infrastructure 106 and base station 108 establish a session between the wireless communication device and the local device allowing communications to be exchanged between the wireless communication device 114 and the local device 128. As part of the session establishment, the base station 108 obtains authorization to route data through the local network 112. The authorization may be authorization only for the immediate session, for the particular wireless communication device, for the particular local device, or other combinations. For the example described herein, the authorization is obtained for every session during the session setup. For another example, however, the authorization is established for the base station 108 for any wireless communication device 114 authorized to access the base station 108 where the authorization is obtained prior to the initiation of any session. In other examples, the local routing authorization may be established for a subset of the authorized wireless communication devices authorized to access the base station 108. Also, other examples may include sending a route-local indicator 120 with every message or packet.

The base station 108 may include or have access to a local AAA (Authentication, Authorization and Accounting) entity 132. The local AAA allows the base station to determine if the wireless communication device 114 is an authorized user of the base station 108 and what privileges or features have been granted to the wireless communication device 114. Accordingly, information associated with the local AAA 132 may be stored in memory 134 of the base station 108 and includes device identifiers, such as serial numbers or phone numbers, identifying the wireless communication devices that are authorized to use the base station 108. In situations where the cellular infrastructure 106 has preauthorized some of those wireless communication devices to utilize the local routing feature, the local AAA 132 includes information identifying those devices. Accordingly, the base station 108 may access the local AAA 132 to determine if a particular wireless communication device is allowed to use the local routing feature. The cellular infrastructure 106 may or may not be informed of a local routing. In the examples described below, however, the base station 108 requests authorization from the cellular infrastructure for local routing for each session during session setup. For purposes of the discussion herein, the session is any semi-permanent interactive information exchange, such as a call or data transfer, between two or more devices where the session is set up at a certain point in time and torn down at a later point in time. An established communication session may involve more than one message in each direction. Further, the physical communication path may be opened or closed during a session. For the example below, the session is established by the cellular infrastructure (core network) and the base station 108 manages the physical connections. In some circumstances, the cellular infrastructure is informed of communication management tasks performed by the base station 108. Such information allows the cellular infrastructure to schedule transmissions to the wireless communication device and otherwise, manage other data and voice communications with the wireless communication device.

After the session is established and local routing authorization is received, the base station receives data messages from the wireless communication device through a cellular uplink signal and may receive messages from the local device through the local network. The base station examines the data message and determines if a route-local indicator 120 has been included in the data message. If a route-local indicator 120 has been received, the base station 108 routes the data message through the local network 112 to the local device 128. In addition, data messages received through the local network 112 from the local device 128 are properly formatted and transmitted to the wireless communication device 114.

As discussed above, the base station 108 may manage various connections with the local network during the session while informing the cellular infrastructure. In addition, or in the alternative, cellular communications may take precedence over the local network traffic. Further, a priority scheme may be established in some situations where certain local communications are reported and others are not reported but are not executed in preference for the cellular communications.

Figure 2A:
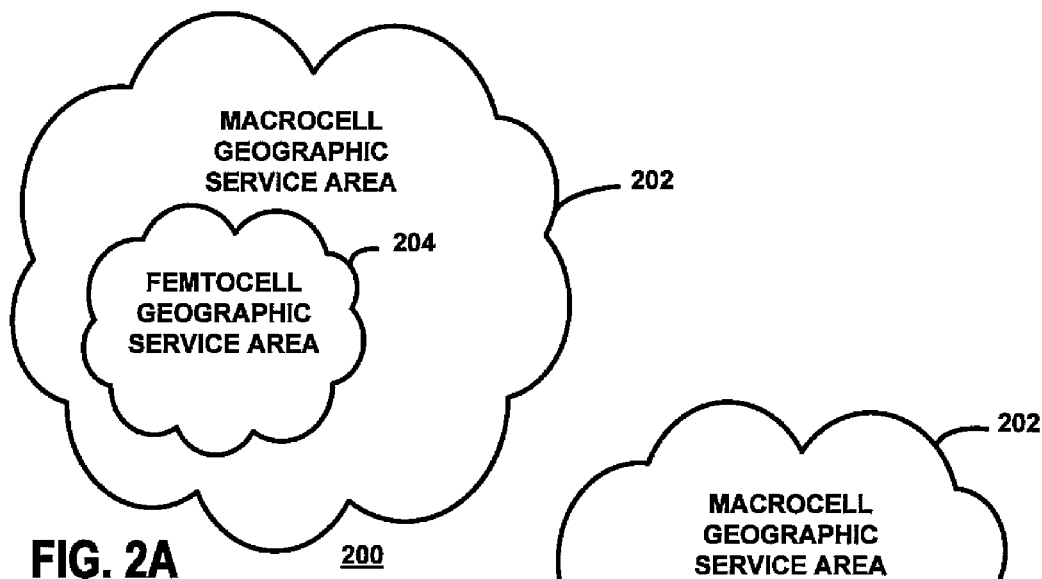
FIG. 2A is an illustration of an exemplary geographical service area relationship provided by a macrocell base station and femtocell base station where the geographic service area of a femtocell base station is within an originating geographic service area of the macrocell base station.
Figure 2B:
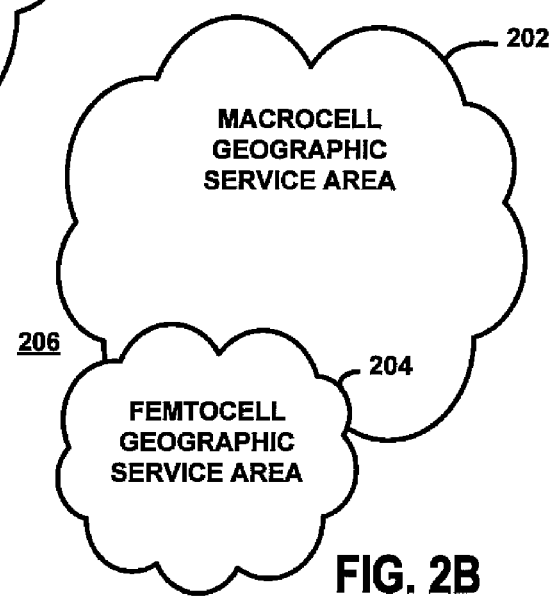
FIG. 2B is an illustration of an exemplary geographical service area relationship provided by the macrocell base station and the femtocell base station where the geographic service area of a femtocell base station overlaps with the macrocell geographic service area of the macrocell base station.
Figure 2C:
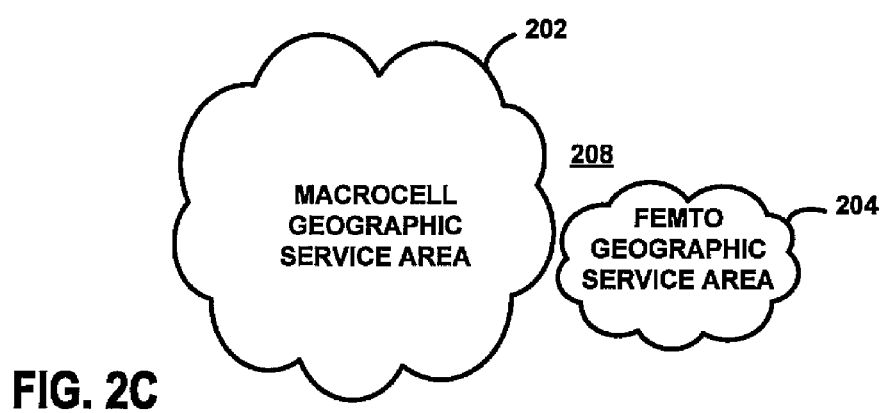
FIG. 2C is an illustration of an exemplary geographical service area relationship provided by the macrocell base station and the femtocell base station where the geographic service area of a femtocell base station does not overlap with the macrocell geographic service area of the macrocell base station.

The wireless communication device 114 includes a controller 136 and a memory 138. The controller 136 is any processor, processor arrangement, or computing device capable of executing the tasks and functions described herein as well as facilitating the overall operation of the wireless communication device. The memory stores data, code, and parameters as well as other information related to applications running on the wireless communication device. For the examples, a local routing application runs on the controller and is any application that may require exchange of data with a local device. When the local routing application is invoked, messaging is sent to the cellular infrastructure to initiate a session. For this example, however, the wireless communication device must be provisioned to run the application. In addition to being an authorized user of the base station, therefore, the wireless communication device 114 must also have been provisioned to have the capability of communicating through the local network using the base station. Such provisioning may be accomplished in accordance with various techniques and is performed by the cellular infrastructure by setting a local-route provisioning parameter 140 stored in the wireless communication device. An example of a suitable provisioning technique includes over the air provisioning where the wireless communication device is configured through a wireless link. In some situations, the wireless communication device is provisioned manually through a user interface of the wireless communication device. In other circumstances, the wireless communication device is provisioned through a data port of the wireless communication device using provisioning equipment. If the wireless communication device is provisioned to use the local route feature, the wireless communication device is configured to include the route-local indicator in data messages. A transmitter 131 transmits uplink signals to and a receiver 133 receives downlink signals. Accordingly, the transmitter 131 is configured to transmit the route-local indicator 120 to the base station 108 and the receiver 133 is configured to receive the provisioning signals 141 that facilitate over the air provisioning and the revision of the local-route provisioning parameter 140. The functions of the transmitter 131 and/or receiver 133 may be at least partially performed by the controller 136 and/or the memory 138. As discussed above, a suitable implementation for the locating routing feature includes an arrangement wherein the base station is a femtocell base station connected within a cellular system that includes other base stations, where at least some of the base stations are macrocell base stations. FIG. 2A, FIG. 2B, and FIG. 2C are depictions of exemplary geographical service area relationships 200, 206, 208 provided by a femtocell base station connected within the cellular communication system and a macrocell base station 115. A macrocell geographical service area 202 provided by the macrocell base station 115 and a geographic service area 204 provided by the femtocell base station 108 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the femtocell base station 108 is completely within the service area 202 provided by the macrocell base station 115. In addition to systems including femtocell arrangements, such service area relationships 200 may occur where some base stations within the communication system provide smaller service regions such as microcell and picocell configurations. A femtocell arrangement may include a femtocell base station located at a local site residence where the femtocell is a service area for devices used by device users living at the residence. When the wireless communication devices are outside the service area 204, service is provided by the larger macrocells. When the authorized wireless communication device is at the residence, however, service is provided by the base station presenting the smaller femtocell service area 204. Accordingly, in most situations, the service area 204 of the femtocell base station 108 will be completely within the service area 202 of the macrocell base station 115. In some situations, however the service area 204 may be partially overlapping with the service area 202 as shown in FIG. 2B or may be non-overlapping but adjacent to the service area 202 as shown in FIG. 2C.

Figure 3:
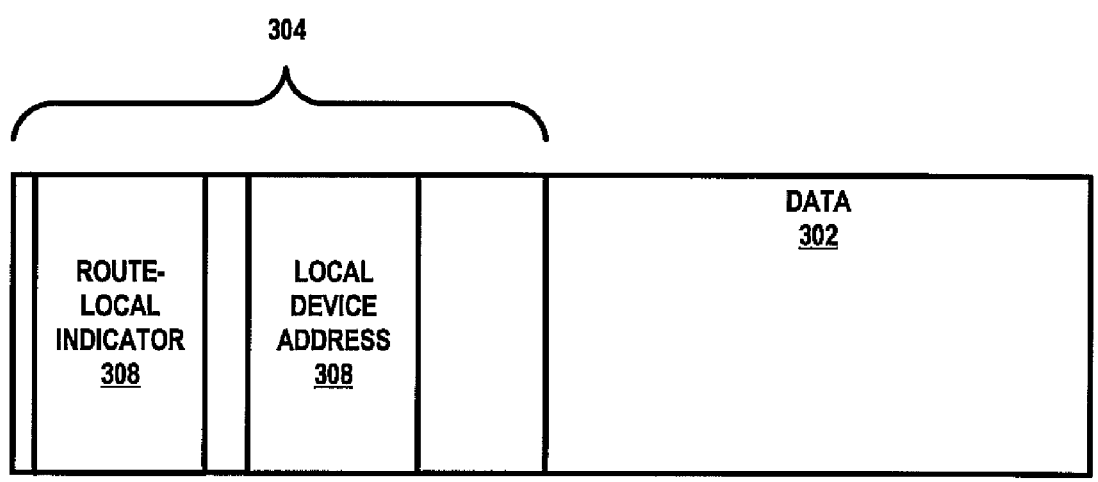
FIG. 3 is a block diagram of a data messages including a route-local indicator.

FIG. 3 is block diagram of data massages that includes a route-local indicator. Although the route-local indicator may be transmitted by the wireless communication devices using any of numerous techniques, a suitable technique places the route-local indicator within a data packet. The data packet includes header where the destination address of the local device is included as well as other information. The route-local indicator is included in the header for the example and may be formed using one or more bits. In some cases, however, the route-local indicator may be included in the data. An example of suitable route-local indicator includes one or more bits forming a "flag" that is interpreted by the base station as an indication that the wireless communication device is transmitting a message intended for a local device that should be routed through the local network. Other indicators may be used in some circumstances. In some cases, a femtocell may have routing capabilities. Then it is aware of local devices IP addresses and by checking the destination address on a packet it can send packets to the local device.

Figure 4:
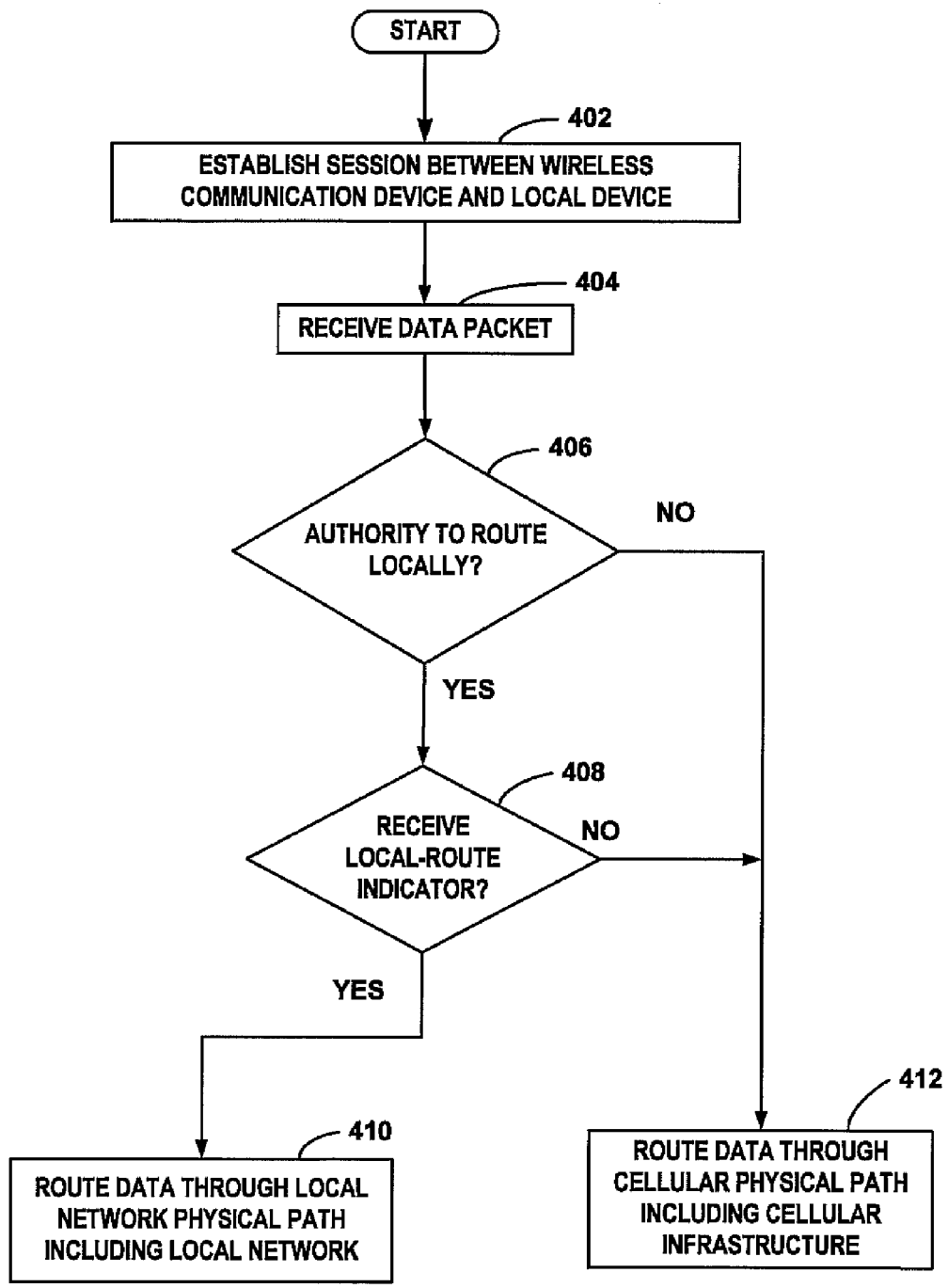
FIG. 4 is a flow chart of a method of routing data through a local network connected to a base station.

FIG. 4 is a flow chart of a method of routing data through a local network connected to a base station. The method may be performed by any combination of hardware, software and/or firmware. The order of the steps discussed below may be varied and one or more steps may be performed simultaneously in some circumstances. In the exemplary embodiment, the method is performed, at least in part, by executing code on a processor in the base station 108.

At step 402, a session is established between the wireless communication device and the local device. As described in further detail below with reference to FIG. 5 and FIG. 6, signaling is exchanged between the cellular infrastructure 106, the base station 108, the wireless communication device 114 and the local device 128 to establish a session after initiation by the wireless communication device 108 or the local device 128. During the session setup, the cellular infrastructure 106 authorizes the base station 108 to use local routing. For the examples, the sessions are initiated by the local routing application that is invoked on the wireless communication device. Information exchanged with the cellular infrastructure during the session setup indicates to the cellular infrastructure that data during the session may be exchanged with one or more local devices 128. Accordingly, where sufficient resources are available and where all required criteria is met, the cellular infrastructure grants authorization for the local routing and establishes and applies the appropriate signaling for the communication path 130 for the session. Where the session is initiated by a local device 128, information is provided by the local device and/or wireless communication device that indicates that data may be exchanged over the local routing path 130.

At step 404, the base station 108 receives a data message. Using the appropriate cellular based protocol and the established session, the wireless communication device sends data messages to the base station 108.

At step 406, the base station 108 determines if the base station 108 is authorized to route data using the local network 112 without routing the data through the cellular infrastructure 106. If authorization has not been granted, the base station routes data through the cellular infrastructure at step 412. Otherwise, the method continues at step 408.

At step 408, the base station 108 determines if the data message includes a local route indicator 120. If the data message includes the local-route indicator, the base station routes data through the local network physical path 130 and does not route the data through the cellular infrastructure at step 410. Otherwise, the base station routes data through the cellular infrastructure at step 412.

At step 410, the base station exchanges data messages between the wireless communication device 114 and the local device 128 through the local network 112. Using an Internet Protocol (IP) based protocol, the base station 108 exchanges data packets with the local device 128. Although the data physical link does not include the cellular infrastructure, the cellular infrastructure may still provide signaling related to the session. Further, the base station applies appropriate formatting to the data exchanged with the wireless communication device 114 in accordance with the cellular protocol. Accordingly, the wireless communication device is not necessarily aware of the local routing of the data since the information received from the base station 108 at the wireless communication device 114 appears identical to information that would have been received if the data had been routed through the cellular infrastructure.

Figure 5:
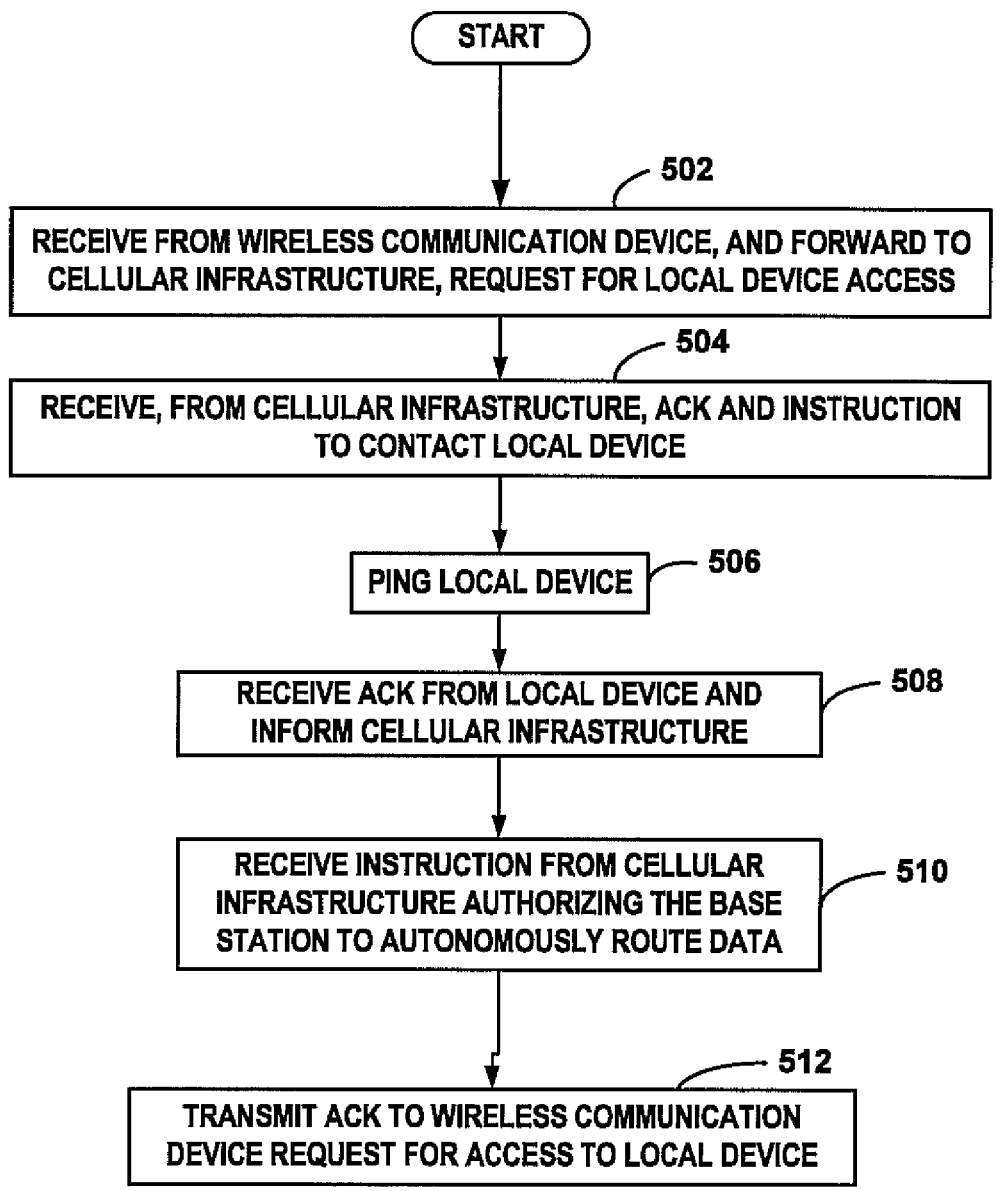
FIG. 5 is a flow chart of a method of establishing a communication session between a wireless communication device and the local device when the session is initiated by the wireless communication device.

FIG. 5 is a flow chart of a method of establishing a communication session between a wireless communication device 114 and the local device 128 when the session is initiated by the wireless communication device. The method may be performed by any combination of hardware, software, and/or firmware. The order of the steps discussed below may be varied and one or more steps may be performed simultaneously in some circumstances. In the exemplary embodiment, the method is performed, at least in part, by executing code on a processor in the base station 108.

At step 502, a request for access to the local device is received at the base station 108 from the wireless communication device. The base station forwards the request to the cellular infrastructure. The request may be forwarded, for example, to the IMS server. As described above, the session may be initiated by an application running on the wireless communication device that requires local routing.

At step 504, an acknowledgment and an instruction to contact the local device is received at the base station 108 from the cellular infrastructure. In some situations, the cellular infrastructure may contact the local device directly if the local device is connected to the cellular system through a cellular link. In such situations, steps 504, 506, and 508 are not performed at the base station.

At step 506, the base station initiates communication with the local device. The base station transmits a message to the local device through the local network.

At step 508, the cellular infrastructure is informed that acknowledgment has been received from the local device.

At step 510, an instruction is received from the cellular infrastructure authorizing the base station to autonomously route data. Accordingly, authorization for local routing is received.

At step 512, an acknowledgment is transmitted to the wireless communication device is response to the request for access to the local device.

Figure 6:
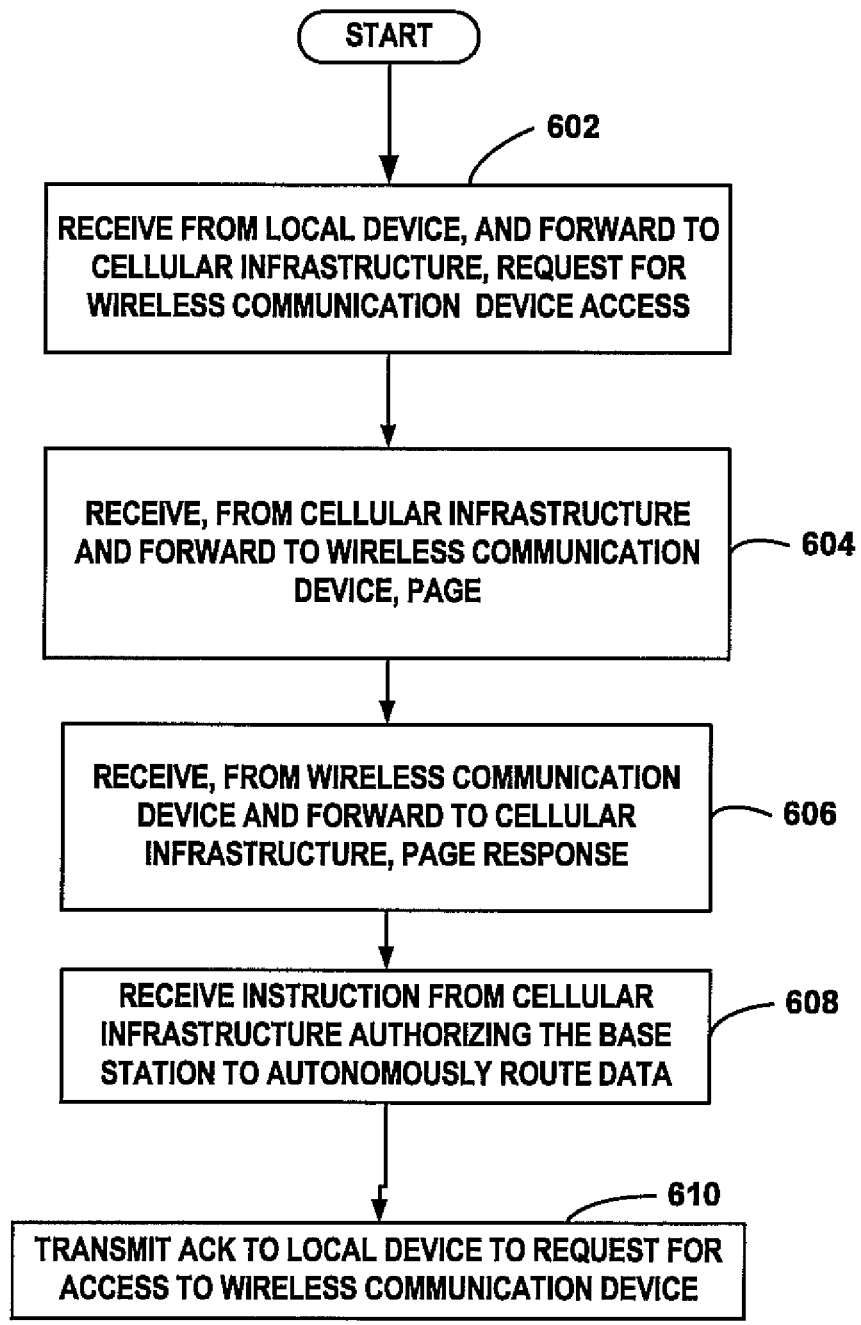
FIG. 6 is a flow chart of a method of establishing a communication session between a wireless communication device and the local device when the session is initiated by the local device.

FIG. 6 is a flow chart of a method of establishing a communication session between a wireless communication device 114 and the local device 128 when the session is initiated by the local device. The method may be performed by any combination of hardware, software, and/or firmware. The order of the steps discussed below may be varied and one or more steps may be performed simultaneously in some circumstances. In the exemplary embodiment, the method is performed, at least in part, by executing code on a processor in the base station 108.

At step 602, a request for access to the wireless communication device is received at the base station 108 from the local device. The base station forwards the request to the cellular infrastructure. The request may be forwarded, for example, to the IMS server.

At step 604, a page from the cellular infrastructure is forwarded to the wireless communication device. The page includes information regarding the local device request for access.

At step 606, a page response from the wireless communication device is forwarded to the cellular infrastructure. In situations, the wireless communication device responds directly to the local device through a WLAN link such as a WiFi connection, if available. In such situations, step 606 is not performed at the base station.

At step 608, an instruction is received from the cellular infrastructure authorizing the base station to autonomously route data. Accordingly, authorization for local routing is received.

At step 610, an acknowledgment is transmitted to the local device is response to the request for access to the wireless communication device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A base station connected to a cellular network, the base station comprising:
   a receiver configured to receive a route-local indicator from a wireless communication device; and
   a local network interface configured to, in response to receiving the route-local indicator, route data between the wireless communication device and a local device through a local network without routing the data through the cellular network.

2. The base station of claim 1, the base station further comprising a controller and wherein the route-local indicator comprises an Internet Protocol (IP) address identified by the controller as associated with the local device.

3. The base station of claim 1, wherein the route-local indicator comprises at least one bit in a header of a message received from the wireless communication device and comprising at least a portion of the data.

4. The base station of claim 3, wherein the route-local indicator further comprises an Internet Protocol (IP) address identifying the local device.

5. The base station of claim 1 further comprising a cellular network interface configured to send a request authorization from the cellular network to locally route the data.

6. The base station of claim 1, wherein the route-local indicator is a request to route the data between the wireless communication device and the local device without routing the data through the cellular network.

7. The base station of claim 1, wherein:
   the base station is a femtocell base station providing a femtocell geographical service area;
   the cellular network comprises a macrocell base station providing a macrocell geographical service area and the femtocell base station; and
   the femtocell geographical service area at least partially overlaps with the macrocell geographical service area.

8. A wireless communication device comprising:
   a transmitter configured to transmit a route-local indicator to request that a base station route data between the wireless communication device and a local device through a local network without routing the data through a cellular network connected to the base station.

9. The wireless communication device of claim 8, wherein the route-local indicator comprises at least one bit in a header of a message received from the wireless communication device and comprising at least a portion of the data.

10. The wireless communication device of claim 9, wherein the route-local indicator further comprises an Internet Protocol (IP) address identifying the local device.

11. The wireless communication device of claim 8, further comprising:
    a controller configured to allow transmission of the route-local indicator if a route-local provisioning parameter is set to allow transmission of the route-local indicator.

12. The wireless communication device in accordance with claim 11, further comprising a receiver configured to receive provisioning signals to set the route-local provisioning parameter to allow transmission of the route-local indicator.

13. A method of managing wireless communication, the method comprising:
    receiving a route-local indicator from a wireless communication device communicating with a base station connected within a cellular network; and
    in response to receiving the route-local indicator, routing data between the wireless communication device and a local device through a local network without routing the data through the cellular network.

14. The method of claim 13, wherein the route-local indicator comprises an Internet Protocol (IP) address, the method further comprising identifying the IP address as associated with the local device.

15. The method of claim 13, wherein the route-local indicator comprises at least one bit in a header of a message received from the wireless communication device and comprising at least a portion of the data.

16. The method of claim 15, wherein the route-local indicator further comprises an Internet Protocol (IP) address identifying the local device.

17. The method of claim 13, further comprising:
    sending a request for authorization from the cellular network to request authorization to locally route the data.

18. The method of claim 13, further comprising:
    determining whether a route-local provisioning parameter is set to allow transmission of the route-local indicator; and
    only transmitting the route-local indicator from the wireless communication device to the base station if the route-local provisioning parameter is set to allow transmission of the route-local indicator.

19. The method of claim 18, further comprising:
    receiving provisioning signals at the wireless communication device to set the route-local provisioning parameter to allow transmission of the route-local indicator.

20. The method of claim 13, wherein the route-local indicator is a request to route the data between the wireless communication device and the local device without routing the data through the cellular network.

* * * * *